June 14, 1955  E. A. BAYER ET AL  2,710,759
HAND TRUCK AND LIFT
Filed June 11, 1952  5 Sheets-Sheet 1
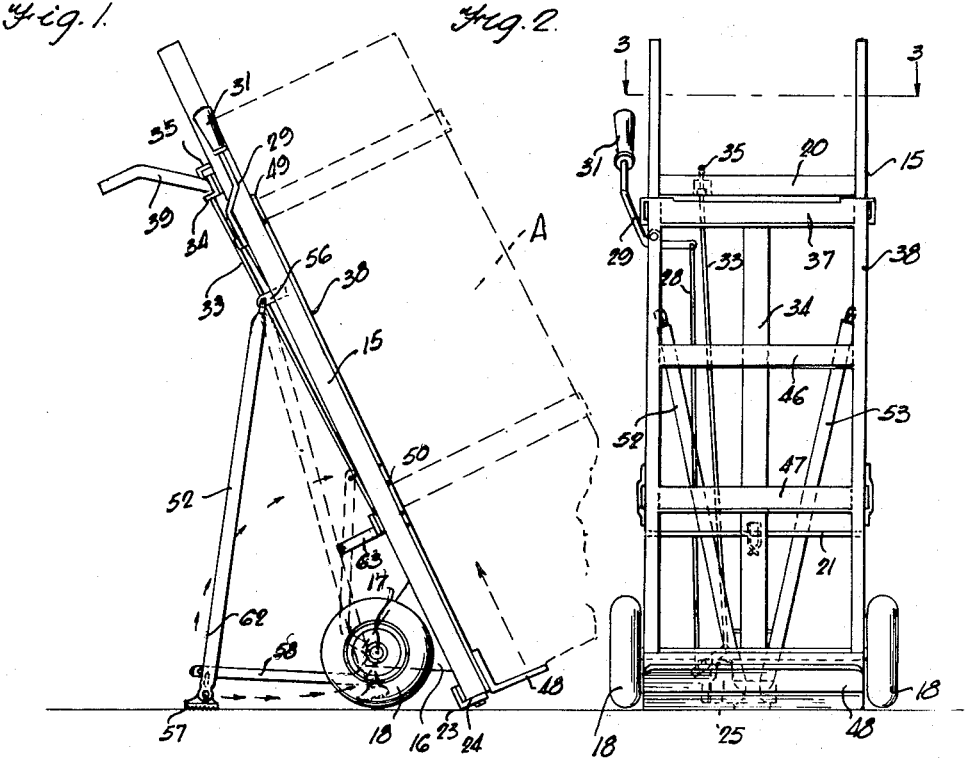
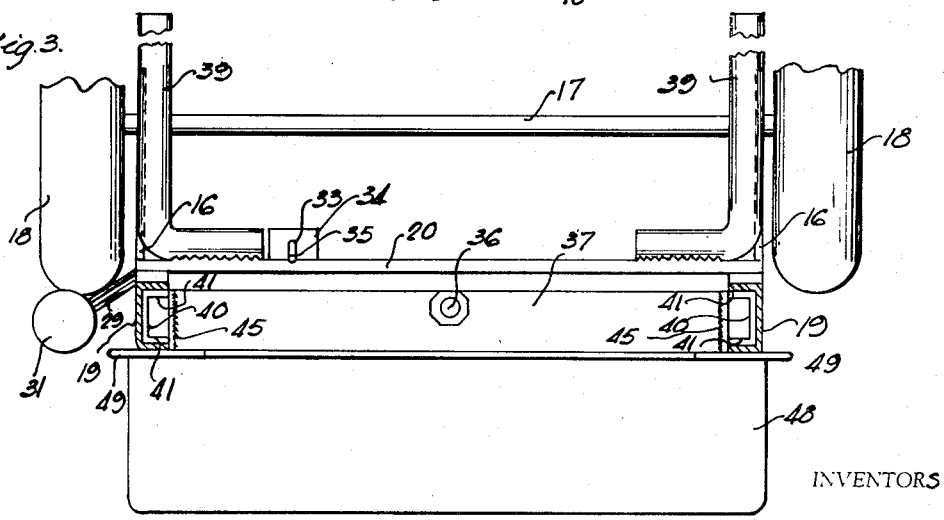
INVENTORS
ELTON A. BAYER AND
LOUIS D. LANGDON
BY
THEIR ATTORNEY June 14, 1955 E. A. BAYER ET AL 2,710,759
HAND TRUCK AND LIFT
Filed June 11, 1952 5 Sheets-Sheet 2

INVENTORS
ELTON A. BAYER AND
LOUIS D. LANGDON
BY
THEIR ATTORNEY

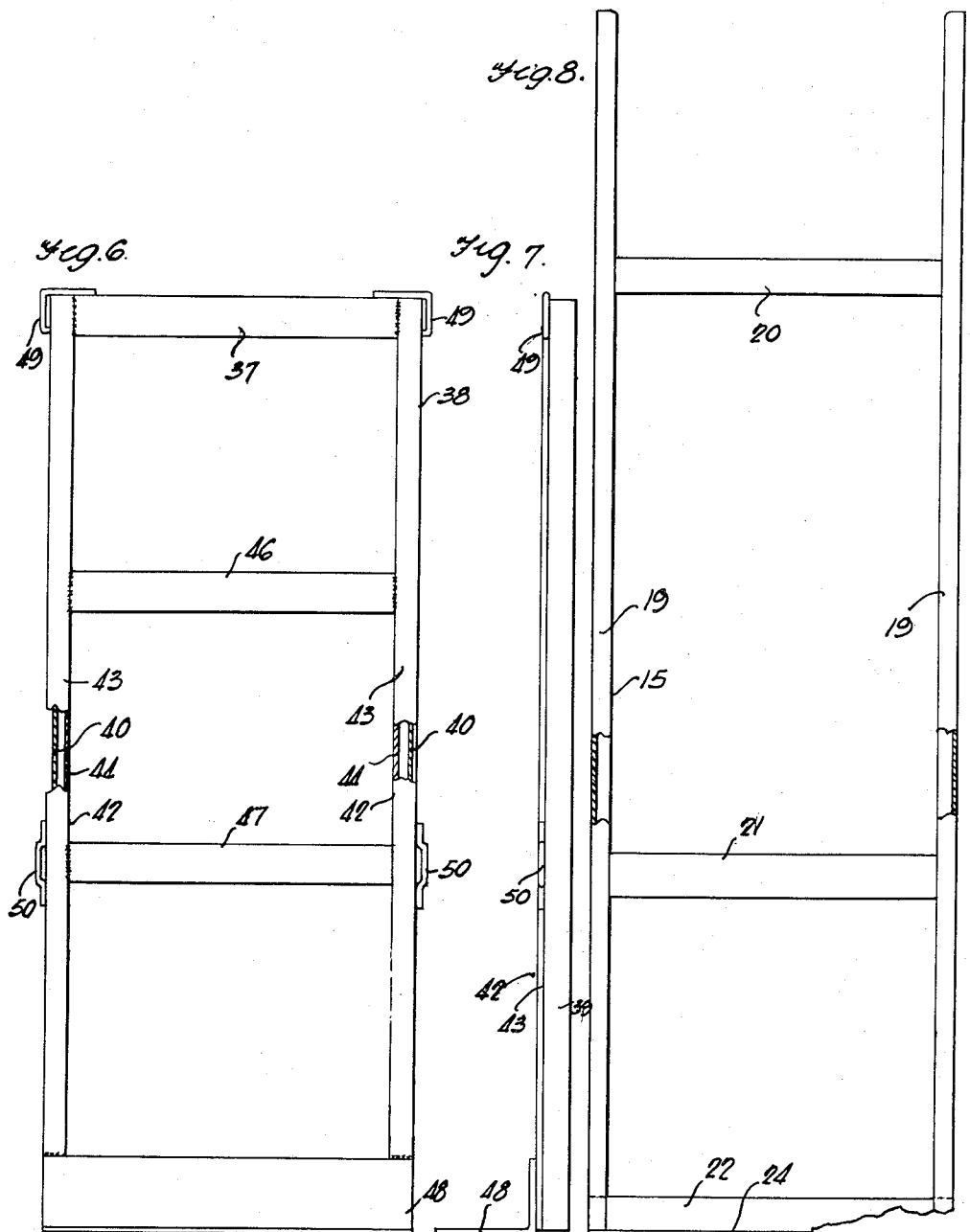

June 14, 1955  E. A. BAYER ET AL  2,710,759
HAND TRUCK AND LIFT
Filed June 11, 1952  5 Sheets-Sheet 4
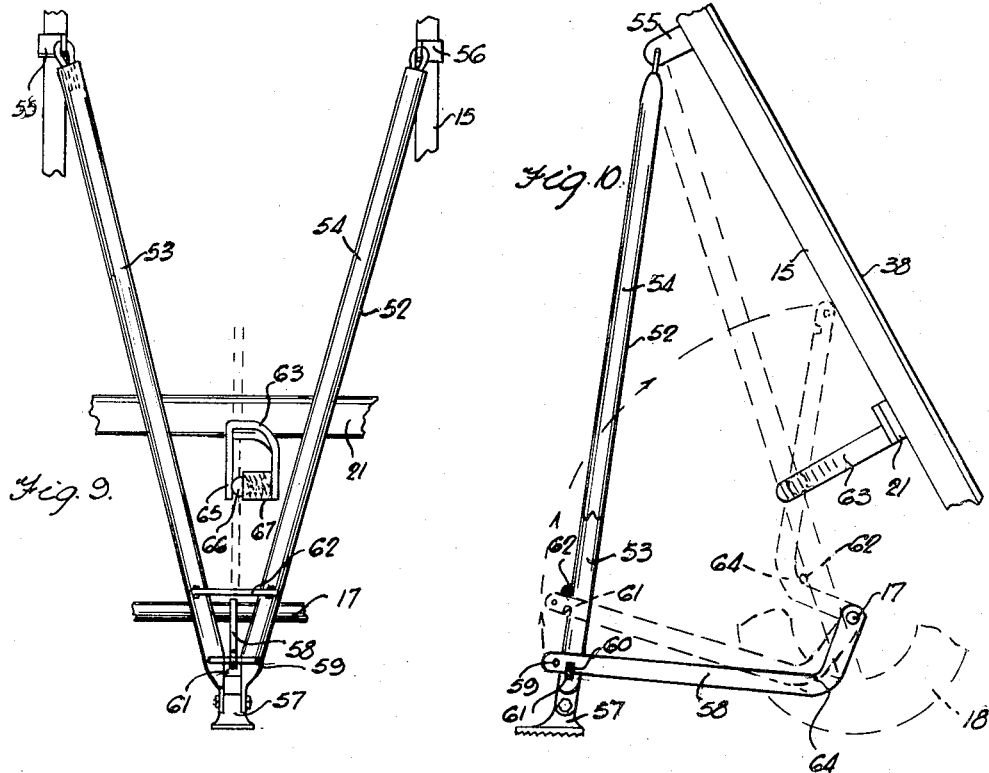
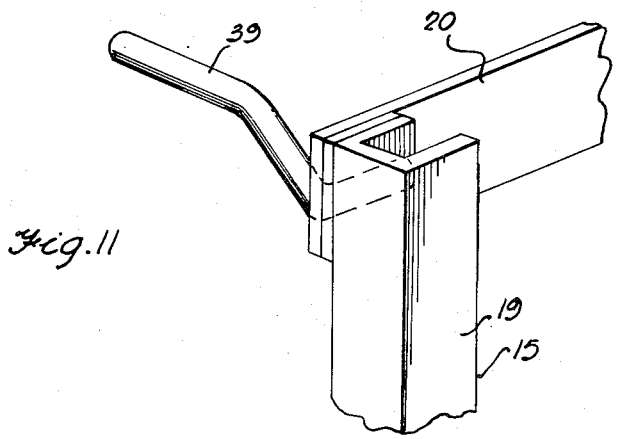
INVENTOR
ELTON A. BAYER AND
LOUIS D. LANGDON
BY *Irving A. McCathran*
THEIR ATTORNEY June 14, 1955　　　E. A. BAYER ET AL　　　2,710,759
HAND TRUCK AND LIFT
Filed June 11, 1952　　　　　　　　　　　　5 Sheets-Sheet 5
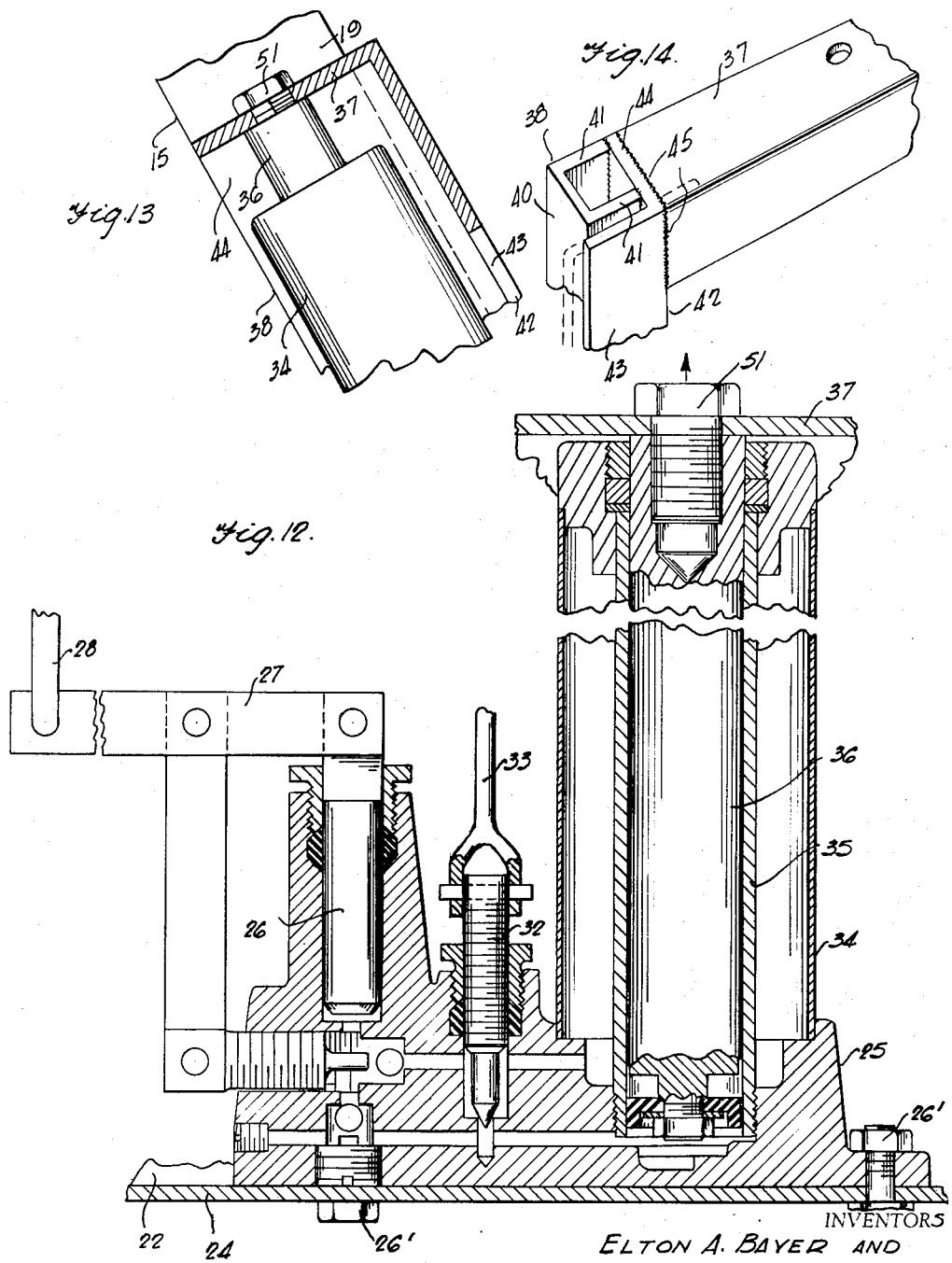
INVENTORS
ELTON A. BAYER AND
LOUIS D. LANGDON.
BY
THEIR ATTORNEY United States Patent Office 2,710,759
Patented June 14, 1955

2,710,759

HAND TRUCK AND LIFT

Elton A. Bayer, Sioux Falls, and Louis D. Langdon, Centerville, S. Dak.

Application June 11, 1952, Serial No. 292,814

1 Claim. (Cl. 280—47.33)

This invention relates to a hand truck and lift, and has for one of its objects the production of a simple and efficient means for elevating and lowering the load receiving platform which is carried by the truck.

A further object of the present invention is the production of a simple and efficient means for slidably mounting the platform carrying frame upon the supporting frame of the truck.

Another object of the present invention is the production of a simple and efficient bracing leg for bracing the truck in an inclined position, and an efficient means for retaining the leg in an inoperative position when not in use.

Other objects and advantages of the present invention will apepar throughout the following specification and claim.

In the drawings:

Figure 1 is a side elevational view of the truck;

Figure 2 is a front elevational view thereof;

Figure 3 is a transverse sectional view taken on line 3—3 of Figure 2, certain parts being broken away;

Figure 6 is a front elevational view of the platform carrying frame, partly in section;

Figure 7 is a side elevational view of the platform carrying frame;

Figure 8 is a front elevational view of the supporting frame upon which the carrying frame is adapted to be mounted;

Figure 9 is a fragmentary rear elevational view of the truck, illustrating the bracing leg structure;

Figure 10 is a fragmentary side elevational view of the truck showing the bracing leg in an operative position in full lines and in an inoperative position in dotted lines;

Figure 11 is a fragmentary perspective view illustrating the structure of one upper corner of the supporting frame;

Figure 12 is an enlarged vertical sectional view of the hydraulic mechanism for operating or lifting the platform carrying frame;

Figure 13 is an enlarged vertical sectional view through the upper end of the platform carrying frame and illustrating the manner of attaching the actuating plunger to the upper plate of the carrying frame;

Figure 14 is a fragmentary perspective view of one corner of the platform carrying frame.

Figure 4:
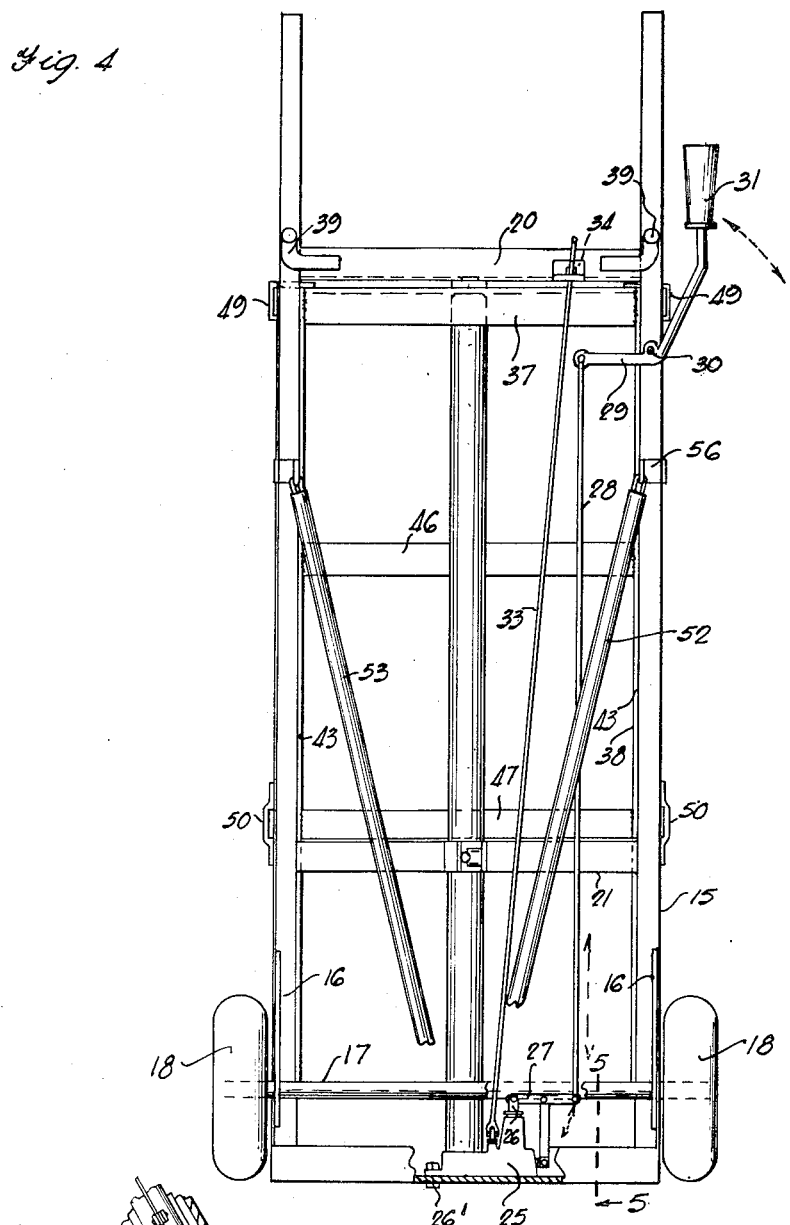
Figure 4 is an enlarged rear elevational view of the truck, certain parts being shown in section and other parts being broken away.
Figure 5:
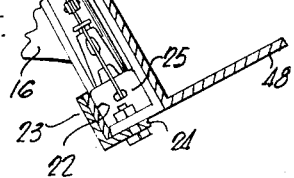
Figure 5 is a fragmentary vertical sectional view, taken on line 5—5 of Figure 4.

By referring to the drawings in detail, it will be seen that 15 designates the main or supporting frame of the hand truck, which frame is provided with axle carrying flanges 16. An axle 17 is carried by the flanges 16 and wheels 18 support the axle 17. The frame 15 comprises a pair of spaced parallel channel members 19 which are connected by suitable transverse plates 20, 21 and 22. The respective channel member 19 have their open faces facing inwardly or toward each other, as shown in Figures 3 and 8. An angle plate 23 is fixed to the rear face of the bottom plate 22 and is provided with a forwardly extending flange 24 which constitutes a support for the hydraulic hoist 25 which is anchored to the flange 24 by suitable bolts 26. The hoist 25 is preferably located near the center of the frame 15 intermediate the lower ends of the channel members 19. The hoist 25 is of the conventional type and the detail construction thereof is not essential to the present invention since any type of hydraulic hoist may be used within the spirit of the invention.

The hoist 25 comprises a conventional pump 26 which is actuated by an actuating beam 27 to which is connected a link 28. The link 28 is connected to the actuating crank lever 29 which is pivotally connected, as at 30, to the rear face and at one side of the frame 15 near the top thereof within easy reach of an operator. The crank 29 is provided with an upwardly extending handgrip 31 which preferably extends parallel to the frame 15 in spaced relation thereto, as shown in Figure 4. The hoist 25 is provided with a conventional threaded needle valve 32 which is actuated by an elongated actuating rod 33. This rod 33 has its upper end journalled in the bracket plate 34 which is carried by the plate 20 of the frame 15. A right-angular terminal 35 is carried by the upper end of the rod 33 to facilitate the rotation of the rod 33 to rotate the valve 32 to open and close the valve 32 in a conventional manner. An upright column 34 is carried by the hoist 25, in which column 34 is carried an upright cylinder 35. A lifting piston 36 is slidable vertically within the cylinder 35 and the upper end of the piston 36 is fixed to the upper transverse angle plate 37 of the platform carrying frame 38. Handles 39 are preferably welded to the rear face of the upper plate 20, as shown in Figures 1 and 3.

The platform carrying frame 38 comprises a pair of parallel upwardly extending laterally spaced channel members 40. Each channel member 40 is provided with inturned flanges 41, and each channel member 40 carries a face rail 42, which rail 42 comprises a front flange 43 and a right-angular flange 44. The flange 44 of one rail 42 is welded to the edges of the inturned flanges 41 of one of the channel members 40 for the full length thereof, and the flanges 44 of the opposite rail 42 are welded to the inturned flanges 41 of its companion channel member 40, as shown in Figure 3—also note Figure 14. The upper piston engaging angle plate 37 of the frame 38 is welded at its opposite ends to the face rails 42, in the manner shown at 45 in Figure 3—note also the detail showing in Figure 14. It should be noted that the front flange 43 is spaced from the adjacent flange 41— note Figure 14, so that the channel members 40 of the frame 38 may snugly fit within the channel members 19 of the frame 15, the flanges 43 overlying the channel members 19 when the frames are assembled. The rails 42 are also connected by means of transverse plates 46 and 47 which are welded at their respective ends to the respective rails 42. An angle platform plate 48 is welded or otherwise secured to the rails 42 at the lower ends thereof. Suitable strap anchors 49 and 50 are carried by the outer edges of the rails 42 at desired locations to facilitate the strapping of a case, or other object A, to the platform carrying frame 38, as indicated in dotted lines in Figure 1, with the case or object A, resting at its lower end upon the platform plate 48.

It should be noted that frame 38 is slidable vertically within the channel members 19 of the frame 15 and that an object A may be lifted upon the frame 15 by actuating the crank lever 29 to operate the pump 26. The pump 26 will be operated as the crank lever 29 is swung back and forth upon its pivot 30. This action will extend the piston 36 to lift the platform carrying frame 38. As shown in Figures 12 and 13, the piston 36 is secured to the under face of the plate 37 of the frame 38 by means of the anchoring bolt 51, so that the piston provides a lifting action upon said plate 37. The pressure from the hydraulic hoist 25 may be released by operating the rod 33 which controls the needle valve 32 to permit the frame 38 to descend upon the main frame 15. It should be understood that the operation of the crank lever 29 and the rod 33 from a convenient position near the handles 39 will enable an operator to raise and lower the frame 38 upon the frame 15 with great facility. Furthermore, the hydraulic hoist 25 provides a means upon the hand truck for conveniently lifting heavy objects with a minimum amount of physical effort and also provides a worthwhile time saver in the moving of heavy objects. One person may place a heavy object upon the hand truck and may operate the truck without assistance which otherwise would be necessary.

A bracing leg 52 is hinged to the rear face of the main frame 15 and comprises a pair of arms 53 and 54 which are hingedly connected to the frame 15 by suitable brackets 55 and 56 respectively. These arms 53 and 54 converge toward their lower ends and are pivotally connected to a supporting shoe 57. A latching bar 58 is pivoted to the axle 17 and is adapted to swing from a substantially horizontal to a substantially vertical position and vice versa, as shown in Figure 10. A transversely extending retaining rod 59 is carried by the outer end of the latching bar 58 beyond the leg 52 in overlapping relation, to limit the outward swing of the leg relative to the bar 58. The bar 58 is provided with a notch 60 in its under face near its outer end for fitting over the transverse latching plate 61 which is carried by the leg 52 adjacent the shoe 57. A transverse spacer bar 62 is welded to the arms 53 and 54 near the lower ends thereof and in vertical spaced relation to the latching plate 61 to constitute an abutment for the outer end of the latching bar 58.

A spring retaining latch 63 is carried by the plate 21 of the frame 15 and extends rearwardly toward the leg 52, as shown in Figure 10. When the latching bar 58 engages the plate 61 of the leg 52, as shown in full lines in Figure 10, the leg 52 will be braced to hold the hand truck at an angle as shown in Figures 1 and 10. When moving the truck, the leg 52 is swung toward the frame 15 and the bar 58 is unlatched and is brought into contact with the spacer bar 62. The bar 58 is snapped into the retaining latch 15 where the bar 58 will be retained until released. The spacer bar 62 will then be retained in the crotch 64 of the bar 58, as shown in dotted lines in Figure 10. The retaining latch 63 preferably comprises a spring jaw 65 and a spring pressed ball 66 which is carried within a casing 67, the bar 58 being adapted to fit between the jaw 65 and the ball 66, as shown in dotted lines in Figure 9.

From the above description, and by considering Figures 9 and 10, it will be noted that an efficient means is provided to hold the leg in a braced operative position, and also to hold the leg in a retracted inoperative position at the will of the operator.

It should be understood that certain detail changes in the mechanical construction and arrangement of parts may be made without departing from the spirit of the invention so long as such changes fall within the scope of the appended claim.

Having described the invention, what we claim as new is:

A hand truck of the class described comprising a frame, a leg member hinged to said frame near the upper end thereof, said leg member comprising a pair of arms converging toward their lower ends, a pivotally connected supporting shoe carried by the converging lower end of said arms, a bracing link hinged to said frame near the lower end thereof, means connecting the link to the leg member between the arms thereof to hold the leg member in an operative position, said leg member having an abutment for engagement with said link as said link is swung toward said frame to automatically swing said leg member toward said frame to an inoperative position, an automatic latch carried by said frame engageable with said link to hold the link and leg member in an inoperative position.

References Cited in the file of this patent
UNITED STATES PATENTS

| | | |
|---|---|---|
| 2,488,461 | Wijsocki | Nov. 15, 1949 |
| 2,514,825 | Zenko | July 11, 1950 |
| 2,532,717 | Hawkins | Dec. 5, 1950 |